(12) United States Patent
Nash, II

(10) Patent No.: US 7,484,739 B2
(45) Date of Patent: Feb. 3, 2009

(54) THREE WHEELED STROLLER WITH SINGLE STEERABLE REAR WHEEL

(76) Inventor: Philip C. Nash, II, 3336 Sycamore Pl., Carmel, CA (US) 93923

( * ) Notice: Subject to any disclaimer, the term of this patent is extended or adjusted under 35 U.S.C. 154(b) by 311 days.

(21) Appl. No.: 11/606,263

(22) Filed: Nov. 28, 2006

(65) Prior Publication Data

US 2007/0126206 A1 Jun. 7, 2007

Related U.S. Application Data

(60) Provisional application No. 60/741,342, filed on Dec. 1, 2005.

(51) Int. Cl.
*B62B 7/06* (2006.01)

(52) U.S. Cl. ............ 280/47.38; 280/47.34; 280/62

(58) Field of Classification Search ............ 280/62, 280/47.34, 47.38, 47.4, 642, 647, 650, 654, 280/657, 658, 47.39, 79.2
See application file for complete search history.

(56) References Cited

U.S. PATENT DOCUMENTS

| 606,451 | A | * | 6/1898 | English | 280/642 |
| 4,268,054 | A | * | 5/1981 | Twitchell et al. | 280/250.1 |
| 5,286,046 | A | * | 2/1994 | Bottemiller et al. | 280/47.38 |
| 6,854,745 | B2 | * | 2/2005 | Driessen et al. | 280/47.38 |
| 7,192,043 | B1 | * | 3/2007 | McLuen | 280/250.1 |
| 7,377,527 | B2 | * | 5/2008 | Cunningham | 280/47.38 |

* cited by examiner

*Primary Examiner*—Christopher P Ellis
*Assistant Examiner*—Brian Swenson
(74) *Attorney, Agent, or Firm*—Bruce H. Johnsonbaugh

(57) ABSTRACT

A three wheeled baby stroller is provided with a single steerable rear wheel. The stroller preferably has the three wheels positioned to form an equilateral triangle, resulting in a highly maneuverable stroller. The stroller has a minimized turning swath and is easily steered. The stroller has a simple and relatively lightweight design. The seat for the infant is positioned relatively low to the ground to increase stability.

5 Claims, 6 Drawing Sheets

THREE WHEELED STROLLER WITH SINGLE STEERABLE REAR WHEEL

CROSS-REFERENCE TO RELATED APPLICATION

This application claims the benefit of and priority from U.S. provisional application Ser. No. 60/741,342 filed on Dec. 1, 2005.

BACKGROUND AND BRIEF SUMMARY

The present application relates generally to baby strollers. More particularly, the present invention provides a stable three wheeled stroller with a single, steerable rear wheel.

A general trend in the design of baby strollers has been to increase the complexity of the stroller to achieve foldability, and features such as parking brakes and extended length frame for jogging, all of which tend to increase the size and weight of the stroller. The increased size and weight tends to reduce the maneuverability of the stroller. It can be difficult to maneuver typical prior art strollers either around tight corners or in cramped quarters such as busy markets, department stores, crowded sidewalks, restaurants, train stations and other similar situations. There is a need for a simple, maneuverable and lightweight stroller.

The present invention meets the above stated need. The stroller of the present invention utilizes a novel, three wheel design with a single, steerable rear wheel. The single, steerable rear wheel minimizes the turning radius and turning swath of the stroller, particularly when the triangular frame forms an equilateral triangle. The single, steerable rear wheel minimizes the effort needed to steer the stroller. To maximize stability, the combined center of gravity of the stroller and infant passenger together is located above the center of the preferred equilateral triangle formed by the frame. The combined center of gravity is also designed relatively low to the ground, further enhancing stability.

Three wheeled baby strollers with a single steerable front wheel are known in the art (see U.S. Pat. Nos. 5,669,624 and 5,765,856). Four wheel baby carriages having two rear steerable wheels are also known in the art (see U.S. Pat. No. 6,854,745).

The prior art also includes vehicles such as fork lifts that have three wheels with a single steerable rear wheel (see U.S. Pat. Nos. 4,373,600 and 4,986,387).

Various other three wheel vehicles are known having a rear steerable wheel (see Japanese published application 110207704A and U.S. Pat. Nos. Re. 32,681 and 4,703,824).

The advantage of a three wheeled stroller with a single steerable rear wheel is the ease with which the stroller may be steered and the short turning radius achievable with the steerable rear wheel. Applicant is unaware of any prior art baby stroller having a three wheel design with a single steerable rear wheel.

A primary object of the invention is to provide a baby stroller having a three wheel design with a single steerable rear wheel, whereby the stroller is highly maneuverable and which has a minimized turning radius.

A further object is to provide a baby stroller with a minimized turning swath.

A further object of the invention is to provide a baby stroller having a simple and relatively lightweight design.

A further object is to provide a highly maneuverable stroller having a three wheel design with a single steerable rear wheel wherein the stability of the stroller is maximized by placing the combined center of gravity of the stroller and baby above the center of the triangular frame and relatively low to the ground.

Further objects and advantages will become apparent from the following description and the drawings wherein:

DETAILED DESCRIPTION OF THE DRAWINGS

Figure 1:
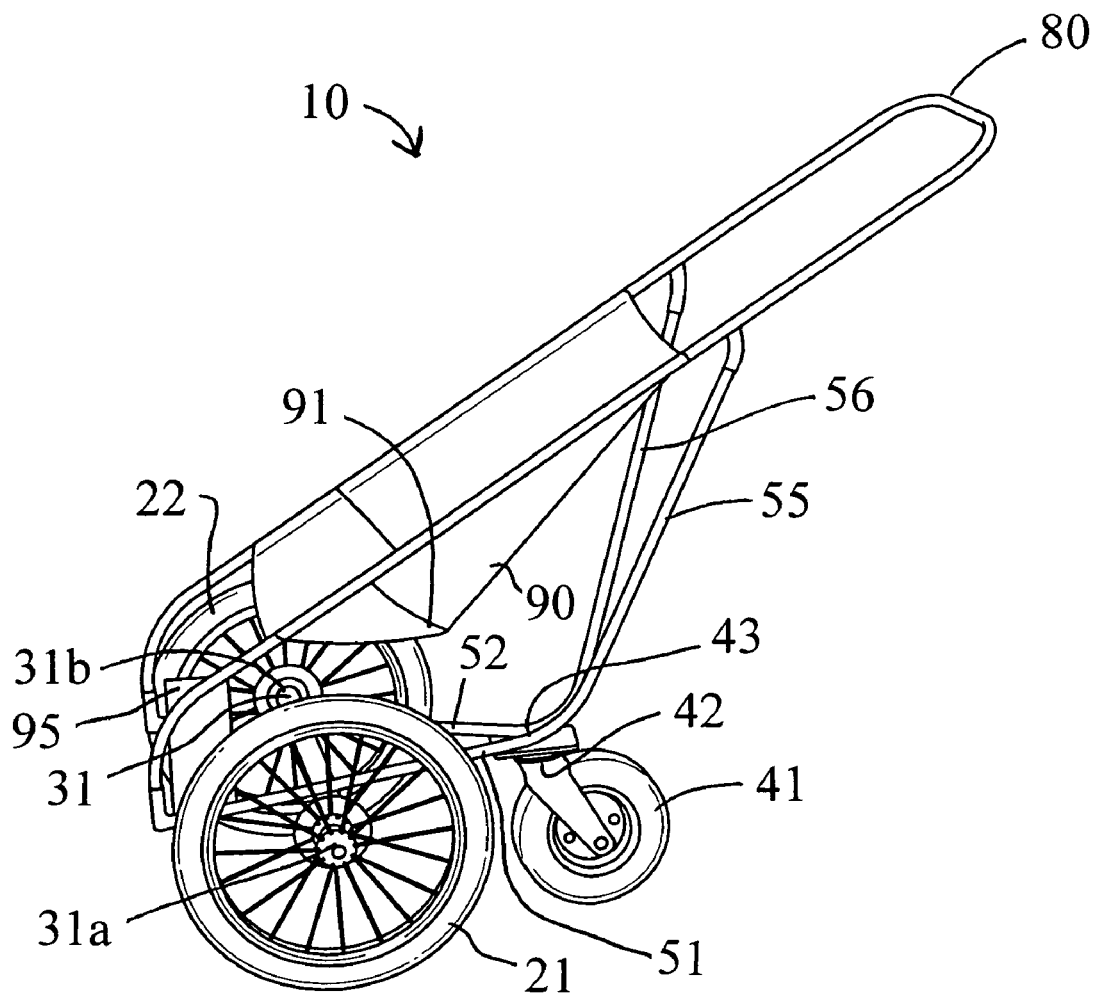
FIG. 1 is a perspective view of the stroller viewing the stroller from the left side.
Figure 2:
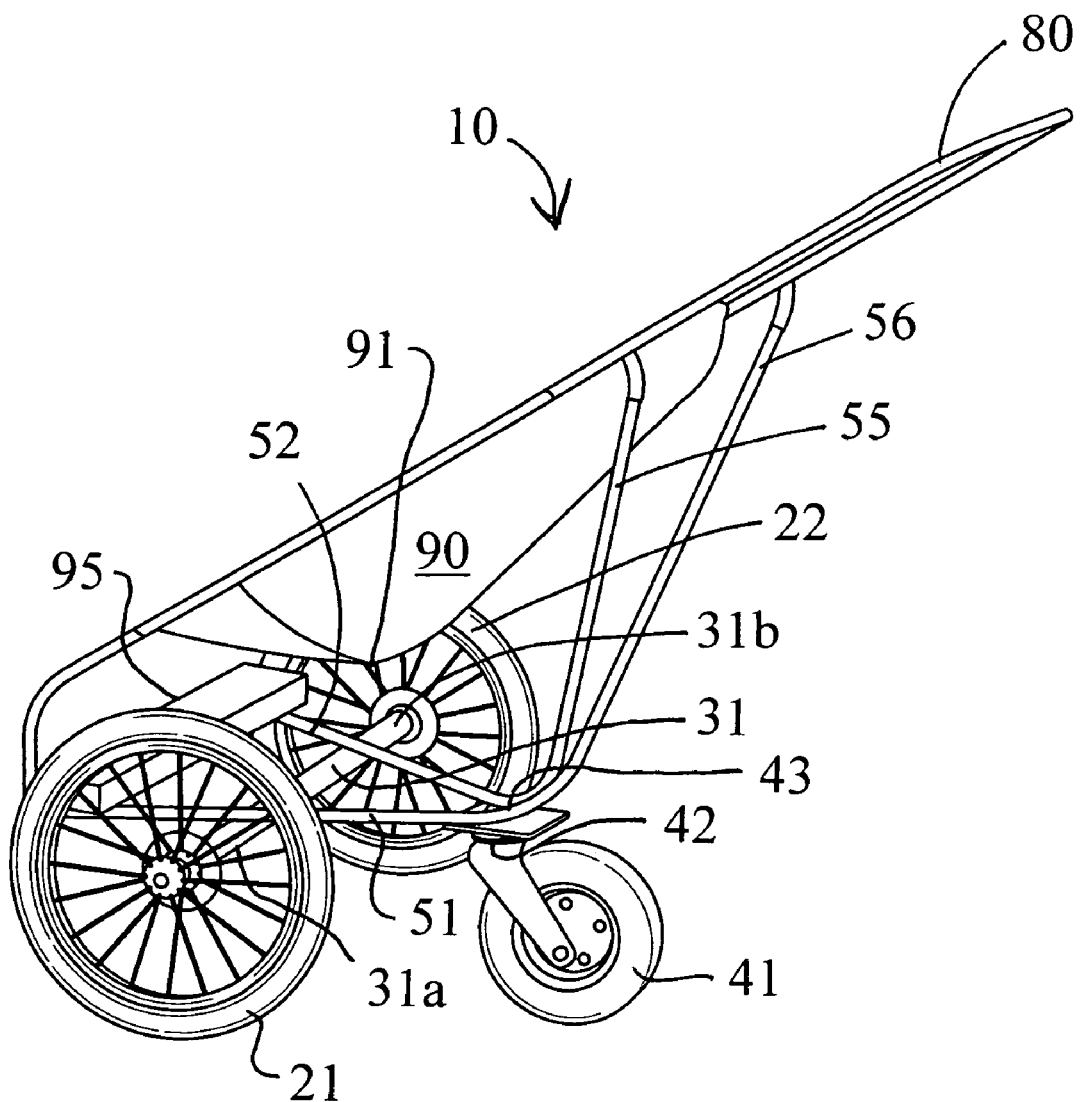
FIG. 2 is a perspective view of the stroller of FIG. 1, viewing the stroller from the left rear quarter.

FIG. 1 is a sketch illustrating a side perspective view of the stroller 10 according to the present invention. FIG. 2 is a perspective view of the stroller 10 of FIG. 1 from the left rear quarter. A pair of front wheels 21 and 22 are connected to a front axle 31. Front wheels 21 and 22 are not steerable. A single steerable back wheel 41 is preferably mounted by a caster 42 to a full 360° pivot point 43.

A handle 80 is utilized by the person operating the stroller. Movement of the handle either to the left or to the right easily controls and steers the stroller 10 around sharp turns and creates an extremely tight turning radius. A seat 90 is provided to carry the infant (not shown). Handle 80 extends upwardly and rearwardly relative to front axle 31 and above rear wheel 41.

Front wheels (or first and second wheels) 21 and 22 are attached to and carried by first and second ends 31a and 31b of fixed axle 31. First and second frame members 51 and 52 are connected to first and second ends 31a and 31b of front axle 31, respectively, and are joined together at pivot point 43. First and second frame members 51 and 52 form preferably an equilateral triangle with front axle 31, the triangle having an apex at pivot point 43, which is the point at which first and second frame members intersect. Rear steerable wheel 41 is shown below pivot point 43. Handle support members 55 and 56 are connected to lower frame members 51 and 52 near pivot point 43 and extend upwardly to support handle 80. Rear steering wheel 41 is preferably caster mounted by caster 42 below pivot point 43 so that it may freely swivel about pivot point 43 through 360°. The freedom of wheel 41 to swivel through 360° provides stability when the stroller moves in a backward or reverse direction.

Figure 3:
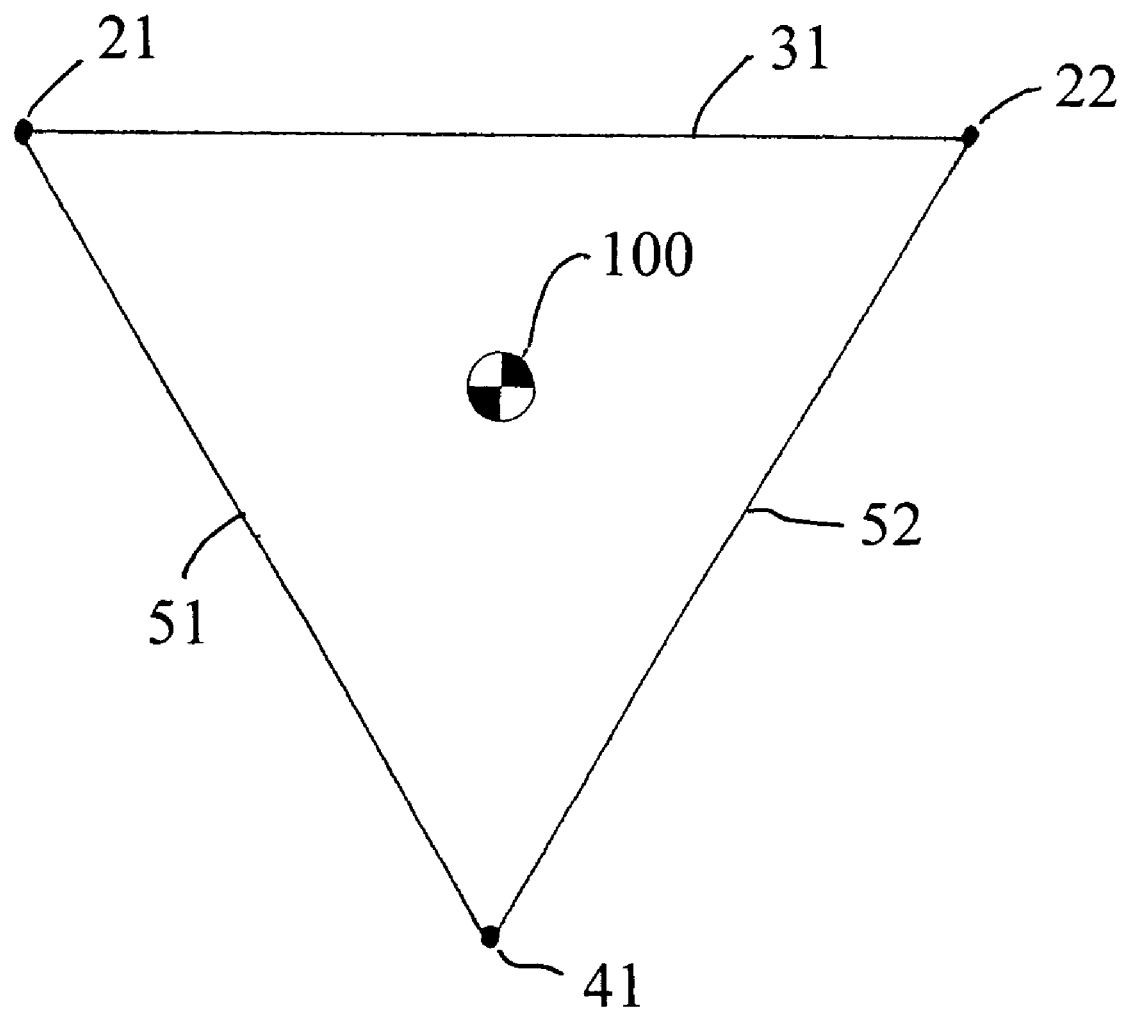
FIG. 3 is a schematic illustration illustrating the turning swath of a prior art four wheel stroller with rear steering wheels.

FIG. 3 is a schematic illustration of the stroller wheels and lower frame illustrating the preferred location of the center of gravity 100. FIG. 3 illustrates the relationship of front axle 31 and first and second frame members 51 and 52. The center of gravity 100, illustrated in FIG. 3, is the center of gravity for the combined weight of the stroller and the design weight and location of an infant carried in the stroller. The preferred location of the center of gravity is as near as possible to being directly above the center of the triangle formed by axle 31 and frame members 51 and 52. The preferred design of the triangle formed by axle 31 and frame members 51 and 52 is an equilateral triangle wherein the length of the frame members 51 and 52 equals the length of the axle 31 and each angle of the triangle formed thereby is approximately 60°. Having such an equilateral design with a center of gravity located in the center of the triangle (i.e., the point inside the triangle equidistant from the three sides of the triangle), as illustrated in FIG. 3, maximizes the stability of the stroller and maximizes its resistance to overturning whether the stroller is moving either in the forward direction or in the reverse direction. Stability in the reverse direction is maximized by allowing the rear wheel 41 to freely rotate as well as to be caster-mounted.

Figure 4:
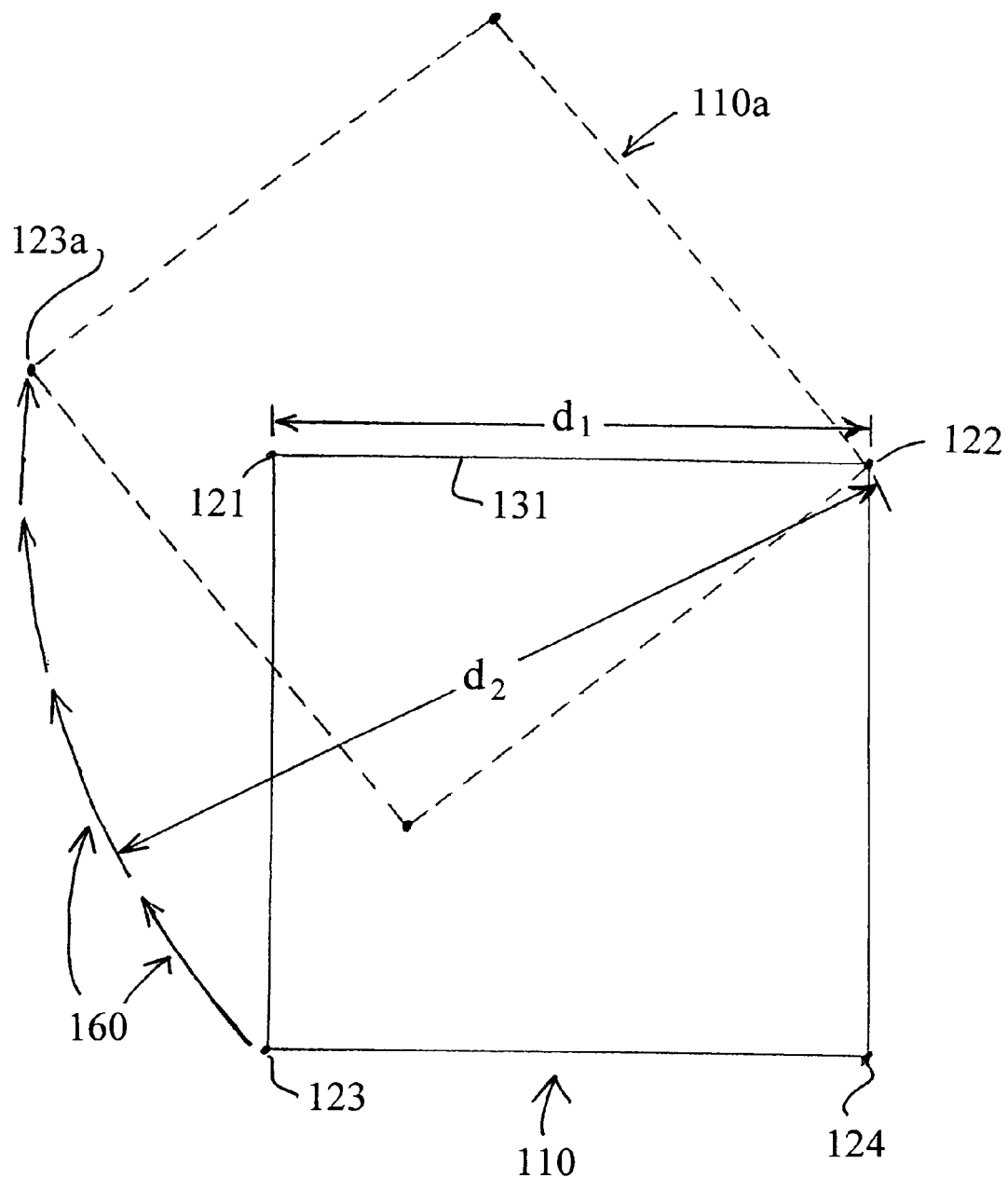
FIG. 4 is a schematic illustration of the turning swath of the present invention.
Figure 5:
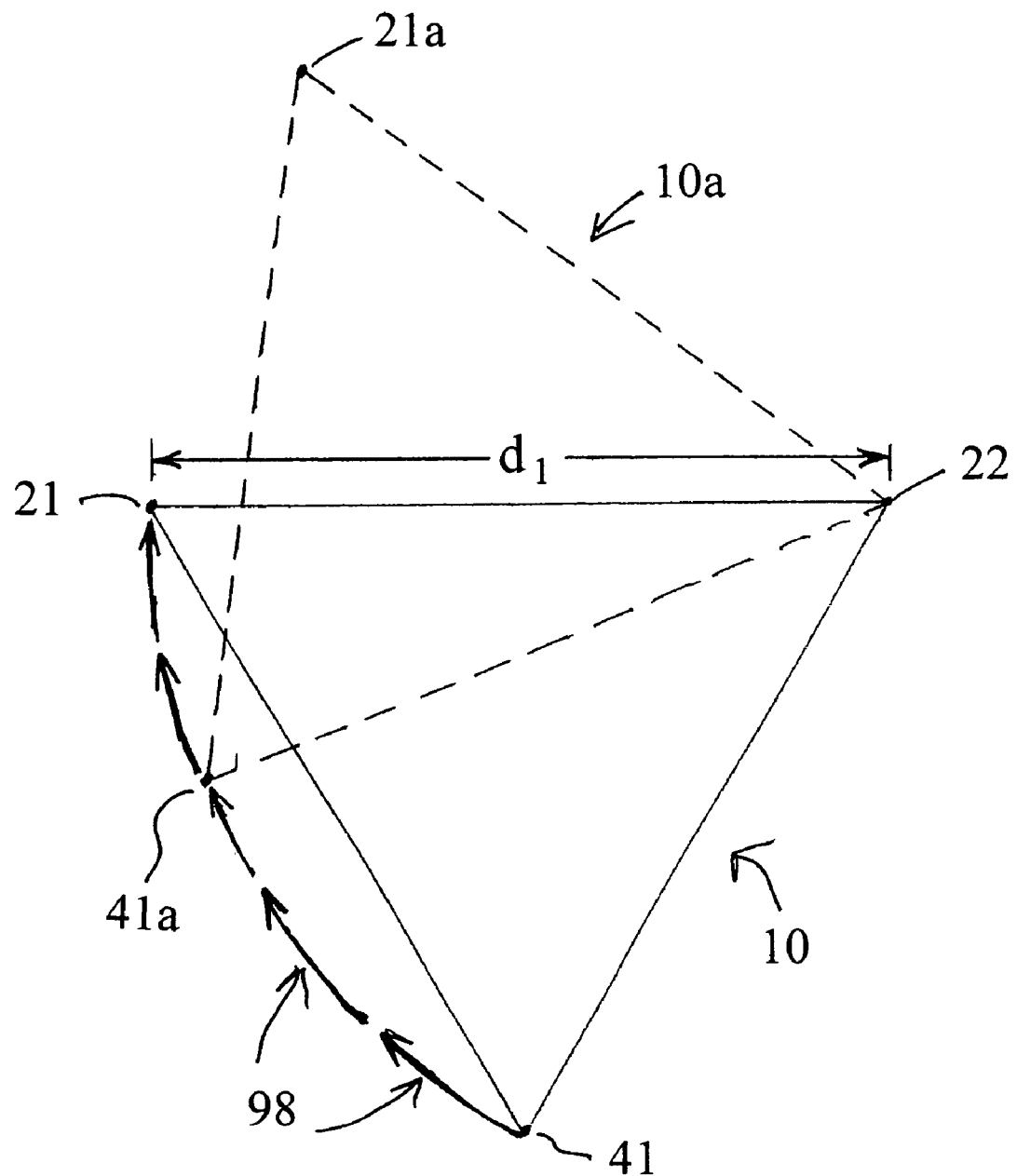
FIG. 5 is a schematic illustration of the lower frame members of the present invention illustrating the preferred location of the center of gravity.

FIGS. 4 and 5 are schematic illustrations intended to illustrate the differences in "turning swath" between the prior art stroller (FIG. 4) and the present invention (FIG. 5).

As shown in FIG. 4, a prior art, four wheel stroller 110 is schematically shown in which a fixed axle 131 connects wheels (not shown) which are centered at points 121 and 122. Axle 131 has a length $d_1$. Stroller 110 has a pair of rear wheels 123 and 124 that are steerable, as is known in the prior art. The distance between front wheel 121 and rear wheel 123 is $d_1$, the same as the length of the front axle, so that the stroller illustrated in FIG. 4 has a square relationship of the four wheels.

Illustrated in phantom in FIG. 4 as 110a is the position of the prior art stroller as it is rotated approximately 50° in a clockwise direction around pivot point 122. It can be seen that the position of the rear wheel 123 has moved to the position shown in phantom as 123a. The path taken by wheel 123 as the stroller rotates around pivot point 122 is a circular pathway shown by curved arrows 160 in FIG. 4. The curved arrows 160 represent the outer edge of the "turning swath" of stroller 110. The turning swath has a width shown as $d_2$, which is significantly larger than $d_1$.

FIG. 5 illustrates a comparable showing of the turning swath of the present invention wherein the stroller is pivoted about front right wheel 22. The distance between wheels 21 and 22 is $d_1$, the same as the distance between the front wheels 121 and 122 illustrated in FIG. 4. Illustrated in phantom as 10a in FIG. 5 is stroller 10 rotated clockwise approximately 60° about the wheel 22. The rear wheel 41 has moved to a point 41a and the front left wheel 21 has moved to point 21a. The turning swath of the stroller 10 illustrated in FIG. 5 is shown by curved arrows 98. The swath illustrated in FIG. 5 is approximately 30% less than the swath of the prior art four wheeled stroller 110. The significance of FIGS. 4 and 5 is that they illustrate the stroller of the present invention can be pivoted around its front right wheel with a swath that is approximately 30% less than a four wheeled stroller of the prior art having two rear steerable wheels. This 30% smaller swath allows the stroller of the present invention to be much more maneuverable in tight and/or crowded places.

Figure 6:
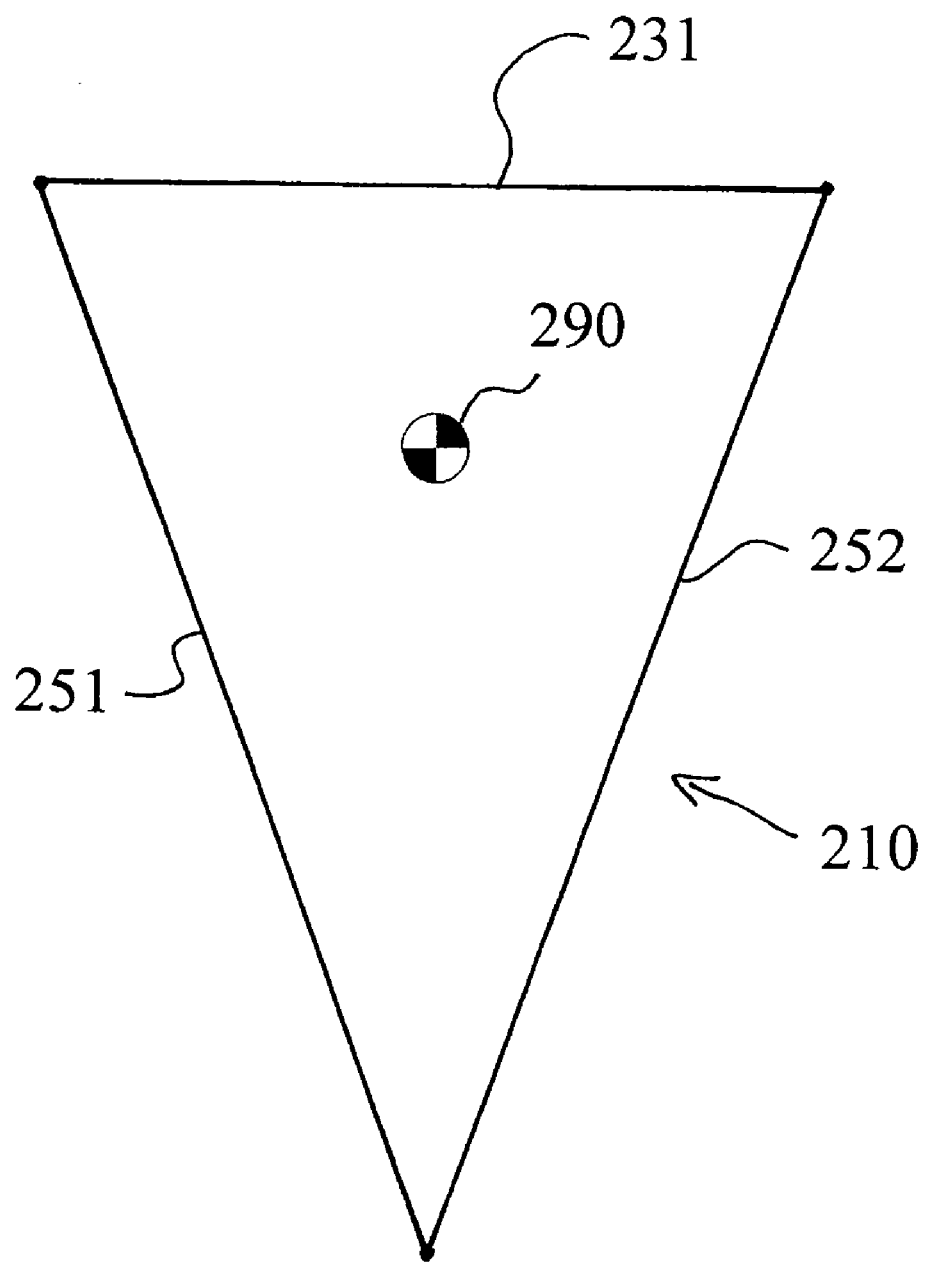
FIG. 6 is a schematic illustration of an alternate embodiment of the invention using an isosceles triangle for the lower frame members as opposed to an equilateral triangle.

FIG. 6 is a schematic illustration of a second embodiment of the invention wherein the frame of stroller, referred to generally as 210, forms an isosceles triangle. The frame includes a front axle 231 and first and second frame members 251 and 252 wherein frame members 251 and 252 are of a length different than the length of front axle 231. In the somewhat less preferred embodiment of FIG. 6, first and second frame members 251 and 252 are of the same length, forming an isosceles triangle. The preferred center of gravity 290 shown in FIG. 6 is the point at which the center of gravity is equidistant from the front axle 231 and each of frame members 251 and 252. That is the combined center of gravity of the stroller with a baby in the stroller is vertically above the "center" 290 of the isosceles triangle formed by axle 231 and frame members 251 and 252.

It is also significant to note that, as shown best in FIGS. 1 and 2, the base 91 of seat 90 is positioned relatively low to the ground to reduce the height above the ground of the baby carried in seat 90. A footrest 95 is carried in front of and slightly above axle 31. Footrest 95 supports the feet of the baby and also tends to provide a protective bumper against any obstacles that might unintentionally be contacted by stroller 10.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A three wheeled baby stroller, comprising:
a front axle having first and second ends,
first and second non-steerable wheels connected to said first and second ends of said front axle,
a third, steerable rear wheel,
first and second frame members connected to said first and second ends of said front axle, said first and second frame members forming a triangle with said front axle, said triangle having an apex formed by the intersection of first and second frame members,
caster means connecting said third, steerable rear wheel to said apex, said caster means allowing said third, steerable wheel to rotate through 360°,
handle means for controlling and steering said stroller, said handle means extending rearwardly and upwardly relative to said front axle, and said handle means extending above said third, steerable rear wheel, whereby said stroller is steerable with a minimum force applied to said handle means, and whereby said stroller has a minimized turning swath.

2. The baby stroller of claim 1 wherein said triangle formed by said front axle and said first and second frame members is an equilateral triangle.

3. The baby stroller of claim 2 further comprising:
a seat adapted to carry a baby, said seat being located to position the center of gravity of the stroller, together with a baby in said seat, above the center of said equilateral triangle formed by first and second frame members and said front axle.

4. The baby stroller of claim 3 further comprising a footrest positioned adjacent said front axle.

5. The baby stroller of claim 1 wherein said triangle formed by said front axle and said first and second frame members is an isosceles triangle, wherein said first and second frame members are equal in length.

* * * * *